Oct. 25, 1927.  
M. G. BERTHON  
1,646,988  
MILLING JIG  
Original Filed June 20, 1923    2 Sheets-Sheet 1

Inventor  
Marcel G. Berthon.  
By His Attorney  
D. Anthony Usina

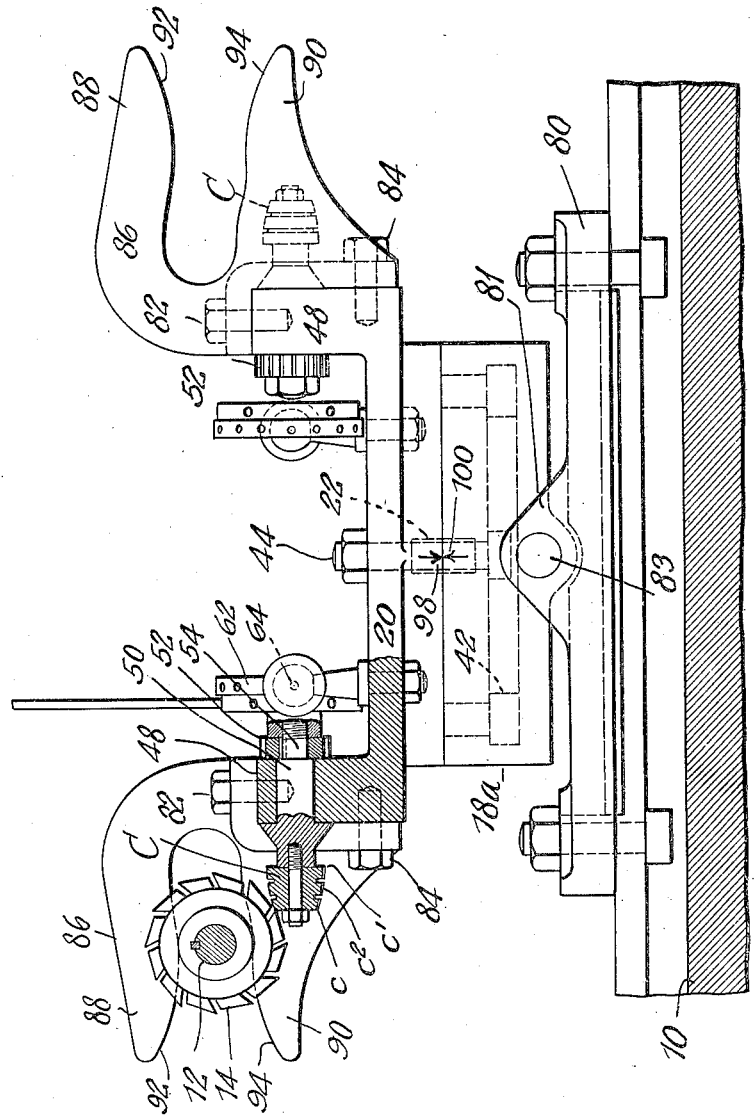

Patented Oct. 25, 1927.

1,646,988

UNITED STATES PATENT OFFICE.

MARCEL G. BERTHON, OF PRATT CITY, ALABAMA.

MILLING JIG.

Original application filed June 20, 1923, Serial No. 646,539. Divided and this application filed June 12, 1925. Serial No. 36,634.

This invention relates to machine tools and aims to provide means whereby the depth of cut made on work pieces can be made to conform to a predetermined contour. The present application is a division of application Serial No. 646,539 filed June 20, 1923. An embodiment of the invention is illustrated in the accompanying drawings in which—

Fig. 2 is a side elevation with certain parts shown in vertical section in the interest of clearness.

Figure 1:
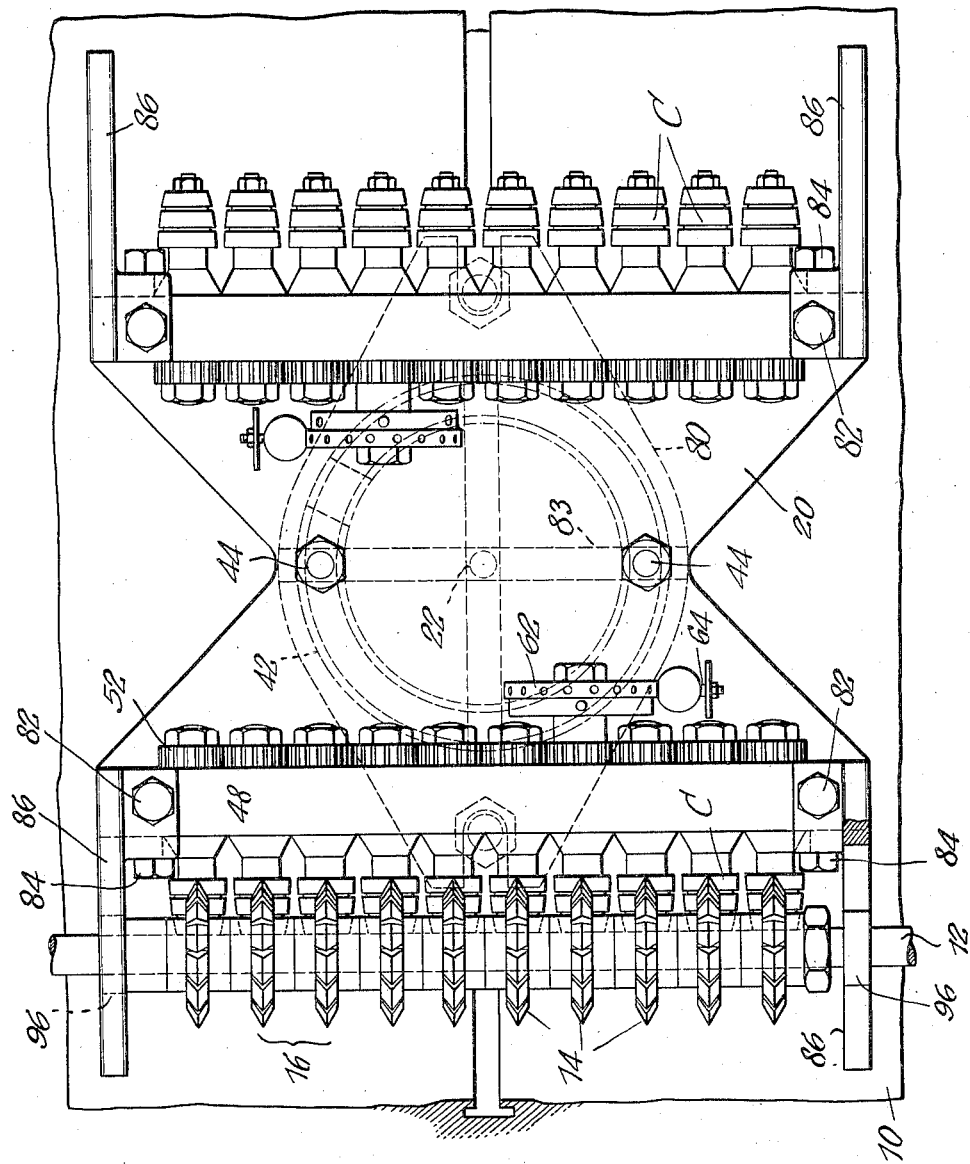
Fig. 1 is a top plan view showing a milling jig and a gang of milling cutters adapted to flute the work pieces carried by the jig.

Referring in detail to the drawings, 10 represents a carriage or table of a milling machine which is movable toward and away from the arbor 12 of a milling machine on which is carried a multiplicity of milling cutters 14 forming in effect a single gang cutter indicated as a whole by a numeral 16.

Adjustably secured to the carriage 10 of the milling machine is a supporting member 80 provided with upwardly extending lugs 81 which form a bearing for trunnions 83 carried by a base member 18$^a$ which supports a turret 20, the latter being pivoted on a vertical spindle 22 and being adapted to be clamped in position by bolts 44 which have heads on their lower ends fitting in the circular T-slot 42. The turret 20 is formed with a pair of upstanding bearing flanges 48 in which are mounted a plurality of spindles 50. Each spindle carries a gear 52 which is keyed or otherwise secured to a reduced shank 54. The several gears 52 carried by the spindle are in mesh and thus form a continuous train. Therefore, if one spindle is turned all the other spindles will be turned with it. One of the spindles is provided with an index disc 62 and the latter is provided with suitable holes 64 and a spring plunger 66 is adapted to enter selected holes so as to position the work blanks for cutting grooves separated circumferentially by any predetermined distance. The work blanks C as shown in Fig. 2 are curved longitudinally from $c$ to $c'$ the intermediate point $c^2$ being beyond a straight line joining the points $c$ and $c^1$. In order to make a cut which is parallel to the longitudinal contour of the blank, that is parallel to the lines $c$, $c^2$ and $c^1$, I provide means for moving the blank relatively to the cutter in such a way that the depth of cut will be constant as the blank is fed toward the cutter. This result is secured by means of cam members 86 which are detachably secured by means of bolts 82 and 84 to the bearing flanges 49 of the turret 20. Each cam member has jaws 88 and 90 whose surfaces 92 and 94 are plotted so as to rock the base 18$^a$ and turret 20 in such manner that as the blanks C advance to the cutters, they will be so moved with respect to said cutters that the resulting cut is of uniform depth and is parallel to the longitudinal contour of the blank. The jaws 88 and 90 engage rollers 96 loosely mounted on the arbor 12 which carries the milling cutters 14. The contour of the cam surfaces of the jaws 88 and 90 shown in the drawing is so plotted that the depth of cut at all points is substantially the same or in other words, the bottom of the groove formed by the cutter is parallel with the contour of the blank. It will be appreciated that by modifying the contour of the cam surfaces 92 and 94, the contour produced by the cut can be varied if desired. For accurately positioning the turret with respect to the base 18$^a$ marks 98 and 100 are provided which are adapted to be brought into register before the clamping bolts 44 are made fast.

While I have described with great particularity the details of the embodiment of the invention illustrated, it is not to be construed that I am limited thereto as changes in arrangement and substitution of equivalents may be made by those skilled in the art without departing from the invention as defined in the appended claims.

What I claim is:

1. The combination of a gang cutter and its supporting arbor of a jig comprising a carriage movable toward and from said gang cutter, a base adjustably secured to said carriage, a turret mounted on said base carrying separate gangs of work supporting spindles, on opposite sides of the turret, a horizontal pivot for said base and means coacting with the cutter arbor for rocking the base on said horizontal pivot so as to move the work blanks carried by said spindles relatively to said cutter so that an even depth of cut parallel to the longitudinal contour of the blank can be secured.

2. The combination of a gang cutter with a jig comprising a carriage movable toward and from said gang cutter, a base adjustably secured to said carriage, a turret mounted on said base carrying separate gangs of work supporting spindles, a horizontal pivot for said base, a cam arranged to engage the cutter carrying arbor to rock the base and turret so as to move the work blanks carried by said spindles relatively to said cutter so that an even depth of cut parallel to the longitudinal contour of the blank can be secured.

3. The combination with a rotary cutter, of a jig comprising a carriage movable toward and from the cutter, a pivotally supported member carrying work blanks, a cam fixedly secured to said member arranged to coact with the cutter carrying arbor so as to rock said member and control the contour and depth of cut produced.

In witness whereof, I have hereunto signed my name.

MARCEL G. BERTHON.